United States Patent [19]

Myer

[11] Patent Number: 4,787,148
[45] Date of Patent: Nov. 29, 1988

[54] NANOMETRIC DRIVE APPARATUS

[75] Inventor: Jon Myer, Woodland Hills, Calif.

[73] Assignee: Hughes Aircraft Company, Los Angeles, Calif.

[21] Appl. No.: 37,495

[22] Filed: Apr. 13, 1987

[51] Int. Cl.$^4$ .............................................. G01B 3/18
[52] U.S. Cl. ..................................... 33/164 B; 33/166
[58] Field of Search .................. 33/164 R, 164 B, 166

[56] References Cited

U.S. PATENT DOCUMENTS

| | | | |
|---|---|---|---|
| 1,133,652 | 3/1915 | May | 33/164 B X |
| 3,002,284 | 10/1961 | Sunnen | 33/164 R X |
| 3,020,775 | 2/1962 | Musser . | |
| 3,088,333 | 5/1963 | Musser . | |
| 4,139,948 | 2/1979 | Tsuchiya et al. . | |
| 4,209,233 | 6/1980 | Eisler . | |
| 4,331,384 | 5/1982 | Eisler . | |

Primary Examiner—Harry N. Haroian
Attorney, Agent, or Firm—V. D. Duraiswamy; A. W. Karambelas

[57] ABSTRACT

A nanometric drive apparatus providing superimposed coarse and fine adjustment for producing axially-directed linear displacement of a single linear displacement element. Linear displacement in the nanometric range is achieved. In the preferred embodiment an elongated shaft having finely pitched threads is controlled by a co-axially integrated coarse control knob. Superimposed and surrounding the coarsely controlled shaft is a nanometric drive assembly which includes a harmonic wave generator for differentially translating small rotational movement between concentric members of the drive assembly to the elongated shaft. The harmonic wave generator is coupled to the elongated shaft through a shaft engagement bearing friction sleeve which continually engages a reentrant sleeve urging the shaft forward in an axially linear direction for movement as small as the nanometric range, or as little as 8.6 millionths of an inch.

13 Claims, 3 Drawing Sheets

NANOMETRIC DRIVE APPARATUS

FIELD OF THE INVENTION

This invention relates to adjustable linear displacement mechanisms, and more particularly, to a linear displacement device having superimposed coarse and fine adjustment, where the fine adjustment capabilities of the device extend into the nanometric measurement range.

BACKGROUND OF THE INVENTION

Traditionally, conventional mechanisms used to produce minute linear displacements have included those mechanisms which incorporate plain or compound levers with large ratios of mechanical advantage, such as finely pitched screws, large ratio gear trains, or hydraulic pistons.

Differential screws have been, heretofore, used to further increase the ratio of movement reduction. Additionally, thermo-mechanical or piezoelectric translating drives requiring both the input of thermal or electrical energy with a supplementary coarse mechanical adjustment have been used for providing minute displacement.

To produce very fine, linear displacement, a relatively large movement must be converted to a small movement in order to provide the minute displacements needed for fine measurement. Just as there are limits to the amount of lever advantage available from a lever system, there is a limit to the amount of motion reduction achievable by a screw or gear mechanism. Inherent in such systems are unavoidable cumulative slack resulting in backlash or mechanical hysteresis. All interactive mechanical parts exhibit a degree of looseness which is manifested as backlash. Mechanical hysteresis arises during the interaction of materials or surfaces of gears and other machine components, where the strain on a material depends not only on the instantaneous value of the applied stress but also on the previous history of the stress applied to a material.

Also, heretofore, conventional minute displacement devices have provided one integrated reduction of movement, requiring additional separate structures for greater and more rapid displacements.

An example of a conventional use of a micrometer to provide coarse and fine adjustments includes U.S. Pat. No. 4,139,948 to Tsuchiya which is directed to a micromanipulator which is constructed to house a pair of micrometer heads (20 and 22 of FIG. 1) which together act against a differential lever 44 to provided fine adjustment. Coarse adjustment is obtained by the individual manipulation of the thimble 38 of micrometer head 22, while the principle of the differential lever or gears allows a 10:1 magnification of displacement between coarse and fine adjustment. Fine adjustment results from the manipulation of micrometer head 20. Thus, this patent teaches one structure for coarse adjustment and another for fine adjustment. Additionally, the interplay of many separate elements, for example, the slider block 48, in conjunction with the bottom plate 6, rear plate 12, and the side plates, may give rise to inherent backlash. A greater negative mechanical advantage needed for even finer adjustments than the 10:1 ratio taught in the U.S. Pat. No. 4,139,948 may be difficult to achieve due to this inherent backlash. Another disadvantage of the Tsuchiya patent is the arcuate movement of the differential lever 44 which leads to a non-linear relationship between the rotation of the fine micrometer head 20 and the movement of the slider block 48.

U.S. Pat. No. 4,331,384 to Eisler presents an optomechanical system for moving optical elements through a number of degrees of freedom. The system attempts to use a minimal number of basic elements to achieve linear and rotational movement. The elements are manipulated by a low friction lever mechanism with a high transmission ratio, through a micrometer screw, of a construction like that shown in U.S. Pat. No. 4,209,233 also to Eisler.

The present invention includes a novel application of a harmonic wave generator for use in conjunction with and superimposed upon a coarse adjustment micrometer to achieve a nanometric displacement drive system, and will be discussed later in this specification. The following are examples of prior art patents for improved wave generator mechanisms which may be of interest for understanding the level of skill in the art prior to the applicant's novel application of the harmonic wave generator in an improved nanometric drive system.

Anti-backlash devices, such as U.S. Pat. No. 3,020,775 to Musser, have heretofore been employed in connection with a harmonic wave generator, which operates as a motion reduction unit; however, the backlash addressed in the U.S. Pat. No. 3,020,775 is related to the control of backlash or play between mating gears, and no suggestion is made therein concerning incorporation of the harmonic wave generator into a nanometric drive mechanism.

U.S. Pat. No. 3,088,333 to Musser also provides an improved fluid wave generator which displays the use of a flex spline 22 (FIG. 1) affixed to a rotating output shaft 26. This patent is not, however, directed to a nanometric displacement drive as is the invention of the present disclosure.

Much of today's scientific experimentation requires minute movement in the ranges down to that of the wavelength of light or a fraction thereof. As the limits of motion reduction are reached by a conventional micrometer, the inherent backlash alone, present in conventional micrometers, will introduce unacceptable errors in measurements below the micrometric range. For example, one turn of a micrometer screw with 40 threads per inch provides a linear displacement of the micrometer shaft of 0.025 inches or 635 microns ($10^{-6}$ meters). The spectrum of visible light ranges from 400 to 800 nanometers ($10^{-9}$ meters, or $10^{-3}$ micron). Thus, one turn of the 40 thread per inch micrometer causes a linear movement of 635,000 nanometers. With a total range of 400 nanometers, it is not surprising that even with a small portion of a turn, it would be difficult to calibrate a conventional micrometer accurately anywhere within such a range. Even the entire range of the visible spectrum represents but 0.06% of one turn of the micrometer screw (0.06% of a turn is about 0.22 of one degree of arc). Even if one could guarantee a micrometer movement within a small linear displacement, the backlash inherent in the interplay of the micrometer screw in its nut would exceed the range of the visible light spectrum.

In order to provide linear displacement within the dimensional range of the visible spectrum wavelengths, it will be necessary for a mechanically based system to significantly improve the motion reduction ratio of the mechanism. This improvement must be provided without the need for cumbersome structures and, preferably, without the need to introduce thermal or electrical energy to drive such a mechanism.

SUMMARY OF THE INVENTION

The present invention applies a superimposed harmonic drive generator on a fine pitched linear displacement screw by means of a coupling friction sleeve. This novel combination permits overriding of the harmonic drive for coarse displacement while the large reduction ratio of the harmonic drive is available for fine adjustments. The nanometric drive apparatus of the preferred embodiment provides superimposed and independently operable coarse and fine adjustment of the displacement of a linear adjustment shaft in an axially forward direction (and retraction in an axially rearward direction) and preferably comprises an elongated threaded displacement shaft, having a plunger on the forward end and being integrally connected to a coarse adjustment means at the rearward end. The nanometric drive apparatus also includes a nanometric adjustment means, the adjustment means being coupled to an harmonic wave generator. The wave generator is coupled to the same threaded displacement shaft through frictional engagement means. In this manner, the nanometric adjustment means may be used to provide nanometric linear displacement to the linear displacement shaft. The coarse micrometric displacement mechanism, without the nanometric driver, is capable of producing linear movement of 635 microns per turn of the micrometric linear displacement screw, where the screw has 40 threads per inch. This screw is directly engaged by the coarse adjustment knob. In order to provide fine adjustments of linear displacement, the harmonic drive generator provides a rotational motion reduction ratio of −80:1. This −80:1 reduction coupled to the same micrometric displacement screw provides a linear movement 1/80th (one eightieth) of a micrometer turn or 7.9 microns. An easily executed 10 degree turn of the harmonic drive input, for example, generates a linear output of only 219 nanometers, less than half the wavelength of the sodium-D-line as measured by optical instrumentation such as a spectrograph or other related optical device.

In the preferred embodiment, nanometric adjustment means may be a fine adjustment knob. This knob may be connected to the inner race of an harmonic wave generator means. The harmonic wave generator means is comprised of an elliptical inner race, which is connected to the fine adjustment knob. Seated along the circumference of the inner elliptical shaped race are a plurality of ball bearings which ride between this inner race and a flexible outer race. The flexible outer race has a plurality of outwardly directed teeth along the outer circumference of the outer race. These outwardly directed teeth engage inwardly directed teeth of a substantially rigid ring gear which surrounds the entire harmonic wave generator means. The flexible outer race is operatively connected to a deformable cup which surrounds the micrometric displacement shaft.

As one turns the nanometric knob adjustment, the elliptical inner race of the harmonic wave generator is pressed against the ball bearings which in turn cause the outer deformable race to harmonically generate a wave on the outer teethed circumference of the flexible and slowly rotating thin walled cup with outfacing teeth. These teeth mesh with a stationary annular ring gear. As the teeth mesh, the flexible race and the rigid and stationary ring gear are deliberately designed with a difference in the total number of teeth. For example, the rigid stationary ring gear may have 160 internal teeth. Partially meshing the stationary rigid outer ring gear with the thin wall flexible inner gear which only has 158 teeth will result in a net lag of two teeth for every full turn of the fine adjustment knob. This lag is the cause of the rotation reduction ratio −80:1.

As the nanometric adjustment knob is turned, the harmonic wave generator pushes against the deformable cup at its open mouth end. The bottom of the cup defines a central hole which concentrically surrounds the displacement shaft. A bearing friction sleeve is telescoped between the micrometric displacement shaft and the circumference of the hole formed at the bottom of the deformable cup, the friction sleeve being activated by the deformable cup. As the cup deforms due to the action of the harmonic wave generation means, the bearing friction sleeve continually engages the micrometer thimble, thereby moving the fine pitch screw and with it the linear displacement shaft in an amount determined by the nanometric adjustment knob acting in conjunction with the harmonic wave generator.

If coarser adjustment of linear displacement is desired, a coarse adjustment knob which is integrally mounted at one end of the micrometric displacement shaft moves this shaft in a bi-directional linear displacement, and moving the plunger in a conventional manner. Where finer movement of the plunger is desired, the friction sleeve mechanism, previously referred to, engages the micrometer thimble and overrides coarse adjustment knob control. The bearing friction sleeve is activated by the action of the wave generator which rides at the open end of the deformable cup.

A retainer mechanism is also provided for surrounding the deformable cup. In this manner, a straight-forward mechanism is presented whereby nanometric adjustments to linear displacement of a micrometric shaft may be made wherein an harmonic wave generator is operatively associated with an engagement friction sleeve mechanism for continuously engaging a micrometer thimble permitting both very minute nanometric and coarse linear displacements of the micrometer shaft as selected by the operator, thereby rendering the micrometric linear displacement shaft useful down into linear displacements as small as fractions of a wavelength of light.

In accordance with a broad aspect of the invention, a displacement shaft may be separately and independently actuated by a coarse adjustment control and by a nanometric adjustment control, with the nanometric adjustment including a harmonic wave generator. As an advantage of the invention, for example, a one degree rotational movement of the nanometric adjustment control will result in a linear axial displacement of the shaft and plunger of approximately 8.6 millionths of an inch (8.6×10−6 inch).

DETAILED DESCRIPTION OF THE PREFERRED EMBODIMENT

Figure 1:
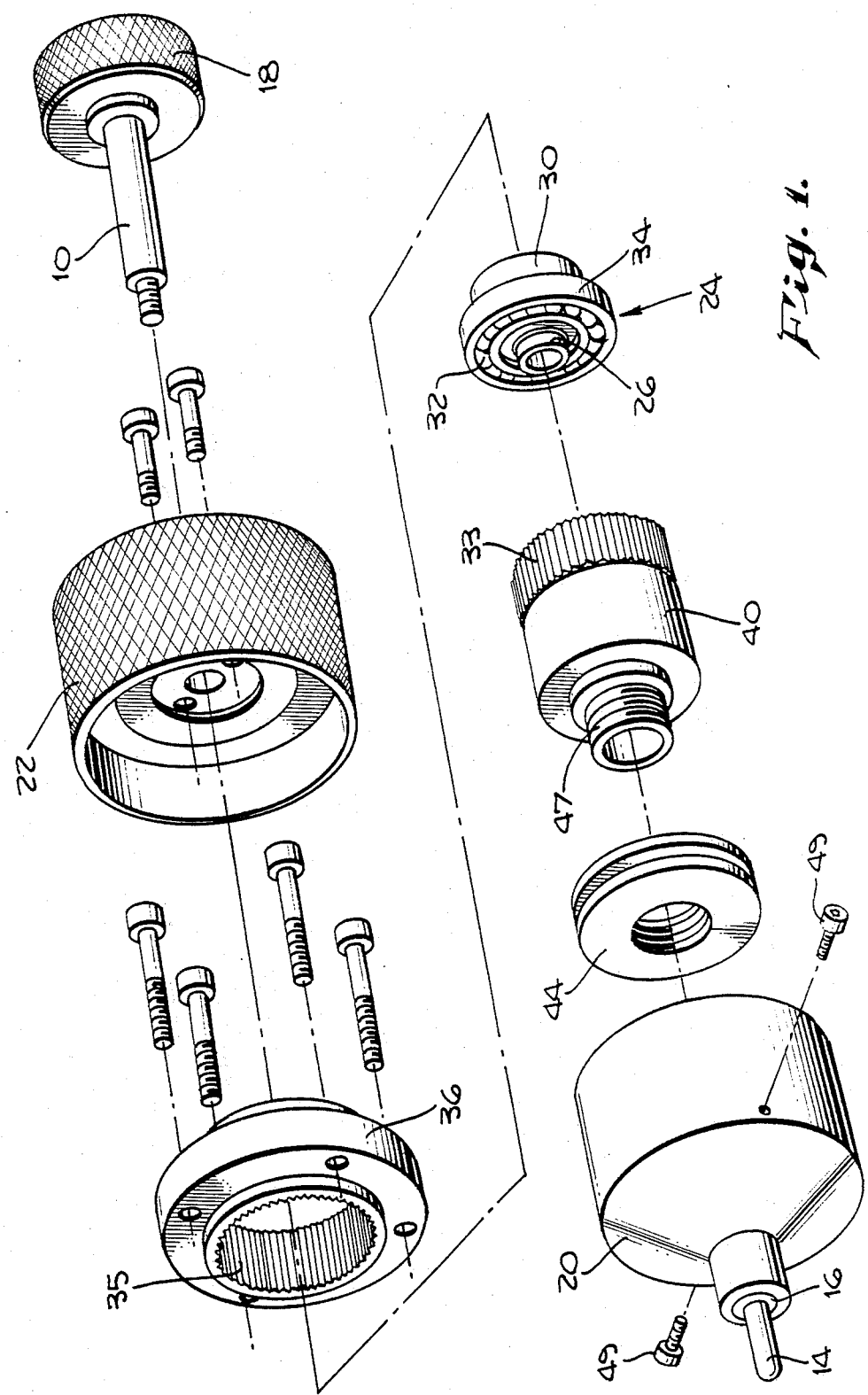
FIG. 1 shows an isometric exploded assembly view of the preferred embodiment of the invention of this disclosure.
Figure 2:
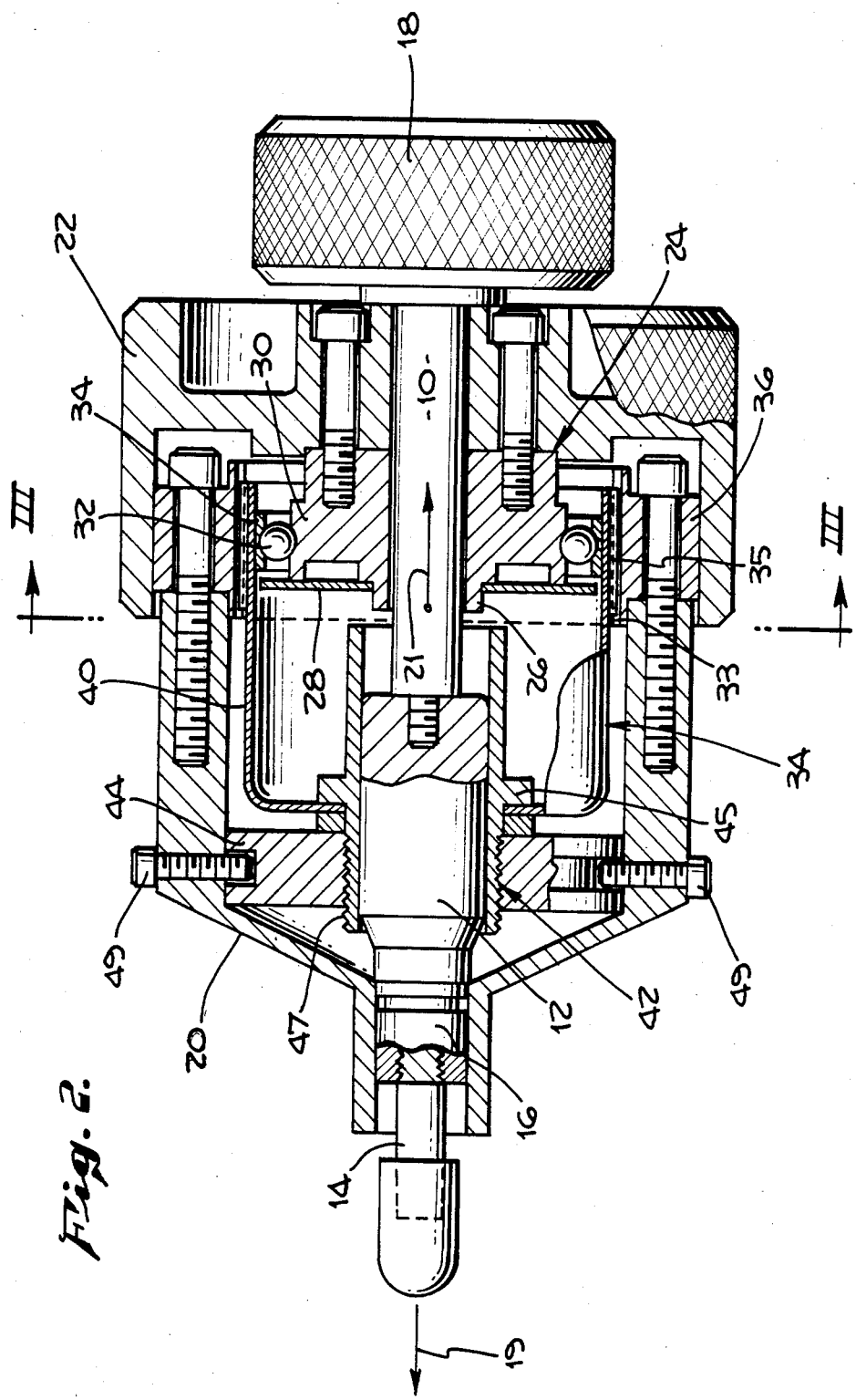
FIG. 2 shows a cross-sectional view of the preferred embodiment of the invention of this disclosure.

With reference to FIGS. 1 and 2, the nanometric drive apparatus is shown generally in FIGS. 1 and 2. In particular, the linear displacement mechanism of this invention has a centrally located moveable elongated displacement shaft 10, which is integrally secured to the plunger end 14, preferably capable of movement in an axial direction 19. In the center of the length of the micrometric displacement shaft is a larger diameter reentrant sleeve 12 such as a micrometer thimble. This sleeve is coaxial with the axially forward thrusting plunger end 14. The shaft 10 and plunger end 14 are secured to the overall housing of the nanometric drive apparatus by means of the nut body 16. The coarse adjustment knob 18, at the rearward end of the elongated displacement shaft 10 and the plunger end 14, may be turned in a clockwise direction in order to cause coarse forward axial movement in the direction 19 or in a counter-clockwise direction to cause retraction, along the shaft's own axis in the direction 21, of the plunger end 14. Turning the coarse adjustment knob 18 moves the shaft 10 and the plunger end 14 forward or backward, since the plunger end 14 incorporates a finely pitched screw (not shown) which turns inside the nut body 16 and causes the shaft's forward movement. As previously discussed, even the most finely pitched screws on the displacement shaft do to not allow the minute displacements that are desirable in the nanometric ranges, for use, for e.g., in the optical instrumentation field. It is for this reason that the displacement shaft 10 and 14 is additionally surrounded by a harmonic drive housing 20, which houses the shaft 10 and 14 and the superimposed nanometric displacement mechanism, described in detail herein.

At the rearward side abutting against the housing 20, a large diameter nanometric adjustment knob 22 is provided to make fine linear displacement adjustments moving the shaft 10 and plunger end 14 in the nanometric range of displacement. This nanometric drive and fine linear adjustment is accomplished by the structure disclosed herein, linking the nanometric adjustment knob 22 with an harmonic drive generator assembly 24.

The nanometric adjustment knob 22 is operatively connected to a collar member 26 which is part of a rigid elliptical inner race 30 which is the core of the wave generator assembly 24. This inner race 30, supports a plurality of ball bearings 32, and together the race 30, bearings 32, and the outer race 34 function as a rolling wave generator, ball bearings 32 being interposed between the rigid inner race 30 and a flexible and deformable outer race 34 which fits into the open end of cup 40 having external teeth 33 (shown in FIGS. 1 and 3). The Disk 28 provides a dust shield for the ball bearing. The plurality of teeth 33 that are outwardly directed along the entire circumference of the cup 40 engage inwardly directed teeth 35 (FIG. 1) of a stationary rigid ring gear 36 at two locations along the inner circumference of said ring gear 36. This stationary ring gear 36 is integrally connected to the housing 20. As a mechanical wave is established by the action of the wave generator assembly 24, a substantial rotary motion reduction is generated whereby a circular movement of, for example, 80 degrees of the elliptical inner race 30, is translated to a minus one degree rotational displacement of the cup 40 around the stationary ring gear 36. The stationary ring gear 36 when contacted in two locations by the wave generator assembly 24, provides the track on which the toothed periphery of the cup travels. The bearing friction sleeve 42 is in circumferential intimate journaled engagement with the enlarged diameter reentrant sleeve 12. Any high viscosity lubricating grease, known in the precision instrumentation arts, should be applied to the interface between the sleeve assembly 42 and sleeve 12. Thus, any displacement of the nanometric adjustment knob 22 is translated through the bearing friction sleeve assembly mechanism 42 to a linear nanometric displacement of the plunger end 14. This movement is effectuated by the linkage which the deformable cup 40 makes with the harmonic wave generator assembly 24. The cup 40 is clamped between the flange 45 by means of threads 47 which integrate this sleeve 42 with the housing securement spool 44. Securement screws 49 (FIG. 2) are used to mechanically locate the spool 44 within the drive housing 20 while permitting it to rotate freely.

In this manner, the harmonic wave generator assembly 24 may be used to produce motion for displacement in the substantially nanometric range. The motion reduction achieved is, typically in the range of −80:1.

Figure 3:
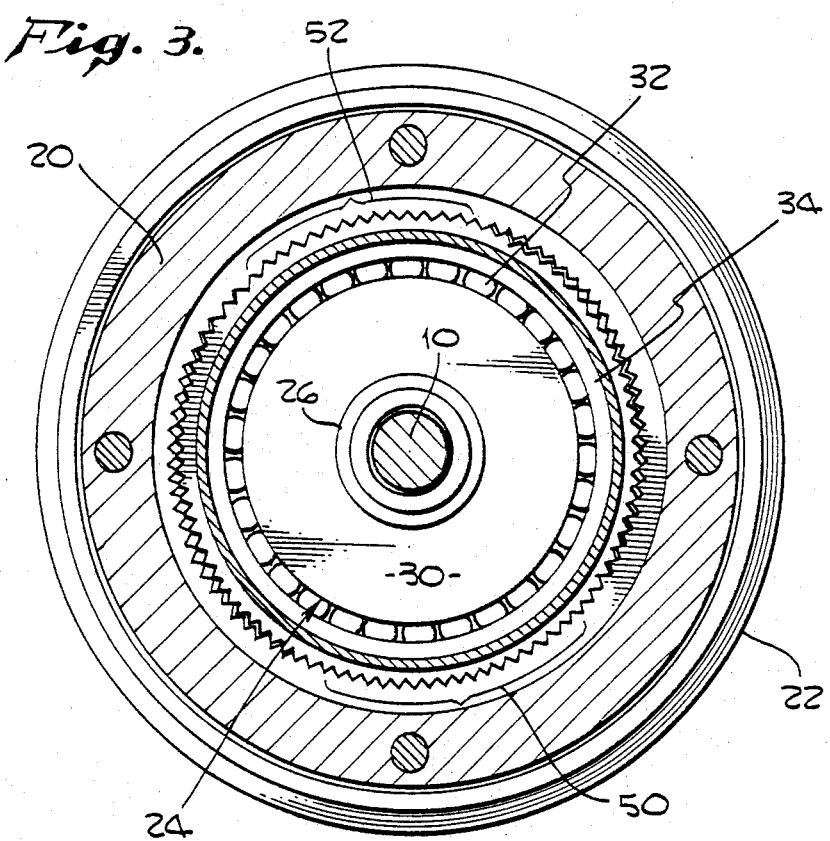
FIG. 3 shows a cross section of the wave generator mechanism taken along line III—III of FIG. 2.

With reference to FIG. 3, there is shown a cross-section of the preferred embodiment of the harmonic drive assembly 24. The wave generating operation of the present invention is well illustrated by FIG. 3. FIG. 3 shows the flexible ring gear 34 at two locations 50 and 52 being engaged by the stationary ring gear 36 (FIG. 2.) The inner elliptically shaped flexible race 30 presses against the plurality of ball bearings 32 to generate a wave which is manifest at two locations around the circumference of the wave generator assembly 24 so that the outer race may selectively travel around the inner circumference of the stationary ring gear 36. Since, as indicated earlier, the inner race has less teeth outwardly directed that the stationary gear 36 has teeth inwardly directed, a negative rotational motion reduction will be induced in the system and may be used to greatly reduce the displacement of the micrometer plunger 40 down into the nanometric range.

Figure 4:
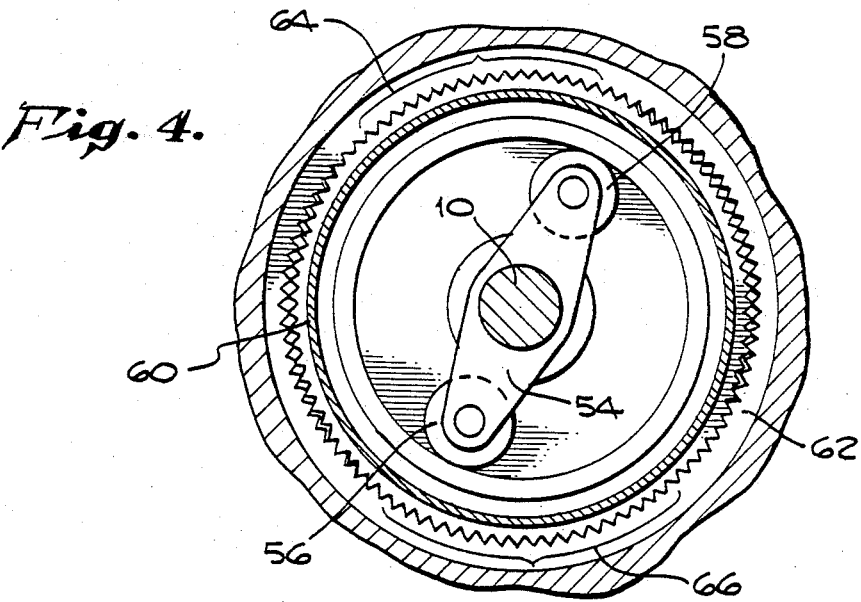
FIG. 4 is an alternative embodiment of the wave generator as shown in FIG. 3.

An alternative embodiment of the wave generator is shown in FIG. 4. Here a wave generator spline 54 having two pivotally mounted rolling lobes 56 and 58 press against a flexible circular member 60 which contacts a substantially rigid member 62 at least 2 points, 64, and 66 and along the inner circumference of the inner member 6. This spline 54 is shown as continuous along its entire length. For purposes of properly interacting within the preferred embodiment, the spline might be affixed about the friction sleeve 42 (FIG. 2) and would have to be made from a flexible material so that the cup 40, to which it is attached, will deform to engage the friction sleeve 42 onto micrometer spindle 12. Using two lobes 56 and 58 will require a difference of two teeth between the gear of the flexible circular member 60 and the gear of the rigid member 62.

In this manner, a structurally compact and straightforward nanometric drive apparatus is shown. It must be appreciated that the preferred embodiment uses the ball bearings and race assembly as shown in Figures 1 through 3 rather than the wave generator assembled as shown in FIG. 4. In any event, the disclosure of this invention shows that the use of an harmonic wave generator is significant in achieving substantial reduction of backlash since many gear teeth are in simultaneous engagement as well as nanometric linear displacement.

While the preferred embodiment of the invention is disclosed herein, the scope of the invention is not necessarily limited to the preferred embodiment. Many changes are possible and these changes are intended to be within the scope of the disclosure. For example, the wave generator assembly 24 need not be confined to an −80:1 angular motion reduction but the ratio can clearly be changed and varied to a high degree as the design requires. What is important is that the number of teeth on the outwardly directed flexible race member be a fixed number of teeth less than the number of inwardly directed teeth of the rigid outer stationary ring gear. In this manner, an harmonic wave generator may be applied and used to provide a nanometric drive apparatus. Consequently, the specific configuration of the harmonic drive, or the construction of the nanometric drive system are merely representative, and are deemed to afford the best embodiment for purposes of disclosure and for providing support for the claims which define the scope of the present invention.

What is claimed is:

1. A nanometric drive apparatus, providing superimposed coarse and fine adjustments of linear displacements, comprising:
   an elongated displacement shaft having an axis, and a plunger on the forward end, and integrally connected to a coarse adjustment means at the rearward end;
   means for nanometric adjustment;
   a harmonic wave generator means coupled to said nanometric adjustment means; and
   frictional shaft engagement means, coupled to said harmonic wave generator means, for rotating said elongated displacement shaft and advancing said plunger forward along the axis of said shaft,
   whereby, said nanometric adjustment means may be used to provide nanometric linear displacement to said shaft along said axis to supplement coarse adjustments which may be made independently by said coarse adjustment means.

2. The nanometric drive apparatus of claim 1 wherein said nanometric adjustment means is a fine adjustment knob.

3. The nanometric drive apparatus of claim 1, wherein the harmonic wave generator means includes:
   a substantially rigid, stationary ring gear having a plurality of inwardly directed teeth;
   a flexible outer race having a plurality of outwardly directed teeth which engage the inwardly directed teeth of said ring gear;
   said shaft coupled as an output for said ring gear;
   a rigid elliptical inner race; and,
   a plurality of ball bearings interposed between said inner and outer races, said ball bearing acting to generate a wave motion of the flexible outer race against the ring gear so that a substantial reduction of motor between said inner race and said outer race may be effectuated.

4. The nanometric drive apparatus of claim 3 further including a flexible cup supported by said stationary ring gear,
   said flexible cup being coupled to said flexible outer race; and,
   said elliptical inner race being connected to said nanometric adjustment means, whereby said nanometric adjustment means may be used to activate said harmonic wave generator means to provide nanometric linear displacement of said shaft.

5. The nanometric drive apparatus of claim 4, wherein said shaft engagement means includes a bearing friction sleeve which continuously engages said displacement shaft when said flexible cup is rotationally deformed;
   said flexible cup rotationally coupled to said bearing friction sleeve and in intimate frictional journaled engagement with said coarse adjustment means.

6. A nanometric drive apparatus, comprising:
   an elongated linear displacement shaft having a plurality of finely pitched threads at its forward end, the threads located adjacent to a plunger and capable of revolving within a nut body which surrounds said shaft;
   said shaft including an enlarged reentrant thimble located at mid-body along said shaft and a coarse adjustment knob integral with said shaft at the rearward end of said shaft, for controlling the rotation of said threads within said nut body;
   a nanometric displacement control knob surrounding said shaft and superimposed and concentric with said coarse adjustment knob;
   a harmonic wave generator means coupled to said nanometric displacement control knob and providing control independent of said coarse adjustment knob to achieve nanometric displacement of said shaft in an axial direction; and,
   said harmonic wave generator means including a deformable cup and a bearing friction sleeve attached to said deformable cup,
   said sleeve being in journaled engagement with said enlarged reentrant thimble, allowing said harmonic wave generator means to nanometrically drive said linear displacement shaft.

7. The nanometric drive apparatus of claim 6, wherein said harmonic wave generator means includes:
   an outer stationary ring gear integral with the housing of said drive, said ring gear having a plurality of radially inward directed teeth for engaging radially outward directed teeth on said deformable cup;
   said deformable cup having a plurality of outwardly directed teeth engaging said ring gear at a plurality of selective locations along the inner circumference of said ring gear; and
   rolling wave generating means for producing a harmonic wave on said deformable cup so as to rotate said cup inside said ring gear; and
   said bearing friction sleeve is frictionally coupled to said linear displacement shaft
   so that said linear displacement shaft is capable of nanometric movement in an axially forward direction and retraction in an axially rearward direction.

8. The nanometric drive apparatus of claim 7, wherein said rolling wave generating means comprises:
   a flexible outer race;
   a rigid elliptical inner race; and
   a plurality of ball bearings sandwiched between said flexible outer race and said rigid elliptical inner race;
   said inner race being linked to a nanometric displacement control knob;
   said outer race being operatively connected to said deformable cup,
   whereby said nanometric displacement control knob may effectuate nanometric displacements of said shaft by initiation of a rolling wave within said harmonic wave generator means.

9. The nanometric drive apparatus of claim 7, wherein said rolling wave generating means comprises:
a spline mounted on a collar member surrounding said shaft;
said spline having pivotally mounted lobes at each end, each of said lobes being capable of riding along the inner circumference of said outer race.

10. A nanometric drive apparatus comprising:
a housing;
a threaded elongated shaft having an axis, located and positioned for axial movement within said housing;
a nanometric drive assembly, coupled to and concentric with said shaft, said nanometric drive assembly comprising:
an inner flexible race member having an outer surface,
an outer stationary ring gear having an inner circumference and radially inward directed means along said inner circumference for sequentially contacting said outer surface of said inner flexible race member;
said outer surface of said inner flexible race member having outward radially directed means for contacting said inner circumference of said stationary ring gear; and,
means for deforming said inner flexible race member and generating a harmonic wave within said inner race member, for transmitting to said threaded elongated shaft so that said shaft is nanometrically linearly displaced.

11. The nanometric drive assembly of claim 10 wherein said outward radially directed means of said race member is a plurality of gear teeth.

12. The nanometric drive assembly of claim 10 wherein said radially inward directed means for sequentially contacting the outer surface of said race member is a plurality of inwardly directed gear teeth.

13. The nanometric drive assembly of claim 10, wherein said means for deforming said inner flexible race member comprises a harmonic wave generator, and the assembly further includes a stationary nut for engaging said threaded elongated shaft so as to provide nanometric axial movement of said shaft.

* * * * *

UNITED STATES PATENT AND TRADEMARK OFFICE
CERTIFICATE OF CORRECTION

PATENT NO. : 4,787,148

DATED : November 29, 1988

INVENTOR(S) : Jon Myer

It is certified that error appears in the above-identified patent and that said Letters Patent is hereby corrected as shown below:

Column 7, line 57, "motor" should be --motion--.

Signed and Sealed this

Thirty-first Day of October, 1989

Attest:

DONALD J. QUIGG

Attesting Officer

Commissioner of Patents and Trademarks